US005268210A

United States Patent [19]

Iijima

[11] Patent Number: 5,268,210

[45] Date of Patent: Dec. 7, 1993

[54] HANDICRAFT ARTICLE

[76] Inventor: Mutsuo Iijima, Yokohama, Japan

[21] Appl. No.: 707,038

[22] Filed: May 29, 1991

[51] Int. Cl.[5] .......... B32B 5/08

[52] U.S. Cl. .......... 428/39; 156/63; 206/575; 428/100; 428/542.6; 434/83

[58] Field of Search .......... 156/63, 92; 206/575; 434/83; 428/100, 542.6, 15, 39

[56] References Cited

U.S. PATENT DOCUMENTS

| | | | |
|---|---|---|---|
| 2,784,513 | 3/1957 | Urbach | 428/15 |
| 2,798,328 | 7/1957 | Fasino | 428/39 X |
| 3,905,848 | 9/1975 | Williams | 428/100 X |
| 3,913,183 | 10/1975 | Brumlik | 428/6 X |
| 4,083,740 | 4/1978 | Hamanaka | 428/11 X |
| 4,110,138 | 8/1978 | Nomura et al. | 428/100 X |
| 4,249,268 | 2/1981 | Berler | 428/100 X |
| 4,445,950 | 5/1984 | Browning | 428/39 X |
| 4,540,375 | 9/1985 | Fogarty et al. | 434/83 X |
| 4,761,318 | 8/1988 | Ott et al. | 428/100 X |
| 5,026,591 | 6/1991 | Henn et al. | 428/198 |

FOREIGN PATENT DOCUMENTS

| | | | |
|---|---|---|---|
| 2041835 | 9/1980 | United Kingdom | 428/542.6 |

*Primary Examiner*—Henry F. Epstein

*Attorney, Agent, or Firm*—Kanesaka and Takeuchi

[57] ABSTRACT

Disclosed is a handicraft article, in which a number of fixing elements is provided on the surface of a base sheet and pieces of media for constituting a design are applied and fixed onto the surface of the base sheet via the fixing elements in such a way that a desired design is expressed on the surface of the base sheet as the aggregates of the fixed pieces.

1 Claim, 5 Drawing Sheets

HANDICRAFT ARTICLE

TECHNICAL FIELD

The present invention relates to a handicraft article, as produced by applying, onto the surface of a base sheet having a number of fixing elements, pieces of bulky work threads which are to be fixed to the fixing elements, the pieces being media for constituting a design, to thereby express a desired design on the base sheet.

BACKGROUND OF THE INVENTION

Hitherto, as handicraft articles, there are known, for example, embroidered design pattern articles for expressing designs of various patterns, figures and/or letters on a cloth by embroidering such patterns and the like in color threads on the cloth, and patchwork articles for expressing designs of various patterns, figures and/or letters on a base paper by attaching patches or pieces of color papers and the like with an adhesive paste.

In the case of the embroidered design pattern articles, it is necessary to draw a draft design directly onto the base cloth and such the draft design is to be drawn by the embroiderer or a base cloth which has a draft design as previously drawn thereon as a commercial product is to be bought in the market. However, the former case is inconvenient to one who has no skill of drawing designs while the latter case has a drawback that the contents of the design patterns and the colors and kinds of the base cloth are restricted.

Additionally, in producing embroidered design pattern articles, it is necessary to stitch the draft design with a color thread by the use of a stitching needle. However, if the base cloth is tough and hard, the stitching needle can hardly pass through the cloth. But if it is soft and flexible, stitching operation must be effected in such a state that the cloth is stretched with a tenter frame. Anyhow, such embroidering is complicated and is often accompanied with danger.

Because of the reasons, the conventional handicraft workings have not been much popularized to anyone in all ages and both sexes. Additionally, there has been another problem that a desired design can not be finished in a short period of time.

On the other hand, regarding the patchwork articles, it requires much work for cutting patches of various sizes in accordance with the desired draft design. Additionally, the finished appearance of the article is often flat and can hardly give a so-called three-dimensional sense and, as a result, the design capable of being expressed by the article is naturally limitative.

Moreover, the above-mentioned embroidered design pattern articles and patchwork articles have the same drawback that once finished, the articles can hardly be repaired or corrected even though they have some unfavorable parts.

Under the situation, the subject matter of the present invention is to provide a novel handicraft article which is free from the problems of the above-mentioned conventional handicraft articles.

Precisely, the first object of the present invention is to provide a handicraft article, which can easily be produced without requiring any particular device and any particular skill in selecting the pattern or figure to be expressed on the article and also in expressing the pattern or figure on a base sheet.

The second object of the present invention is to provide a handicraft article, in which the already produced pattern or figure can easily be repaired, corrected or modified at any time after finishing the article.

The third object of the present invention is to provide a handicraft article, which has an well ordered appearance without requiring any further particular post-working step.

Other objects, characteristics and advantages of the present invention will be obvious from the explanation of the preferred embodiments of the present invention with reference to the drawings attached hereto.

SUMMARY OF THE INVENTION

The first gist of the present invention resides in a handicraft article, in which a number of fixing elements is provided on the surface of a base sheet and pieces of media for constituting a design are applied and fixed onto the surface of the base sheet via the fixing elements in such a way that a desired design is expressed on the surface of the base sheet as aggregates of the fixed pieces.

The second gist of the present invention besides in the handicraft article, in which the pieces to be fixed with the fixing elements are composed of one or combination of two or more of bulky work threads, woven or plastic sheet pieces having, on the surface thereof, additional elements to be fixed with the fixing elements on the base sheet, and composite pieces composed of such sheet pieces and additional plastic pieces, glass pieces, cloth pieces or thread bundles to be fixed to the sheet pieces.

The third gist of the present invention resides in the handicraft article, in which the base sheet is composed of a light-permeable material.

The fourth gist of the present invention resides in the handicraft article, in which a background sheet is attached to the back surface of the base sheet.

The fifth gist of the present invention resides in the handicraft article, in which a draft design is drawn or previously printed on the background sheet.

The sixth gist of the present invention resides in the handicraft article, in which a draft design is previously printed on the back surface of the base sheet.

In accordance with the present invention, an embroidery-like handicraft article can easily be prepared without use of needles, merely by applying bulky work threads onto the fixing elements as provided on the surface of the base sheet in order and in accordance with a desired design whereupon the applied pieces are lightly pressed with fingers onto the fixing elements so that the pieces may well be fixed with and embedded into the fixing elements.

The operation is carried out by an operator who simultaneously refers to a draft design beside him/her. Alternatively, the operator may personally draw a desired draft design on the back surface of the base sheet, or the operator may refer to a draft design as previously printed on the back surface of the base sheet. As still another embodiment, the operator may previously draw any desired draft design composed of patterns, figures and/or letters on a paper, which may be attached to the back surface of a base sheet, or a draft design sheet derived from, for example, gravure pictures of magazines may also be used. As a further embodiment, a background sheet of expressing a background color or a background scene may be attached to the back surface of the base sheet so as to enrich the expression of the finished handicraft article. If desired, a draft design may be drawn on the background sheet in order that the sheet is used as a draft design sheet.

DESCRIPTION OF THE PREFERRED EMBODIMENT

Figure 1:
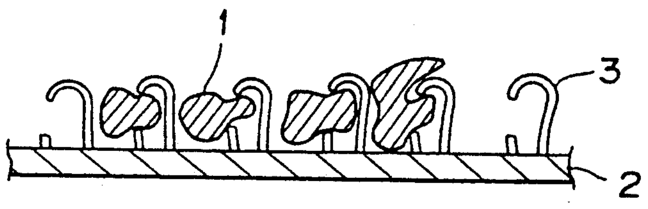
FIG. 1 is a partly enlarged cross-sectional view of one example of the handicraft article of the present invention.

Next, the handicraft article of the present invention will be explained in detail with reference to examples as illustrated in the drawings attached hereto.

FIG. 1 which shows one embodiment of the handicraft article of the present invention is referred to, where bulky work threads or the bulky pieces (1) are applied onto the surface of a base sheet of a plane fastener (2) having a number of fixing elements (3), whereupon the pieces (1) are entangled with the fixing elements (3) so that the former are embedded into the latter.

In the illustrated embodiment, the plane fastener having hook-like or mushroom-like fixing elements on the surface thereof is used as a base sheet, which, however, is not limitative. For instance, the base sheet may be in any other form where fixing elements (3), which may fix the pieces (I), are projected from the surface of a woven sheet or a plastic sheet.

The above-mentioned bulky work threads which are used as the pieces (1) to be fixed with the fixing elements (3) are not limitative but may be any of crimped threads, air-work threads (TASLAN work threads by E. I. Du Pont de Nemours and Company), knitted or deknitted threads which can be fixed with the fixing elements (3) in the form of being embedded in the elements (3).

As the pieces (1) to be fixed with the fixing elements (3), there may also be used, in addition to the above-mentioned bulky work threads, loop plane fastener pieces which form a pair with the plane fastener as the base sheet as well as composite pieces composed of such loop plane fastener pieces and additional plastic pieces, glass pieces, cloth pieces, or thread bundles. Combination of two or more different types of such pieces (1) may also be employed in the present invention.

Figure 2:
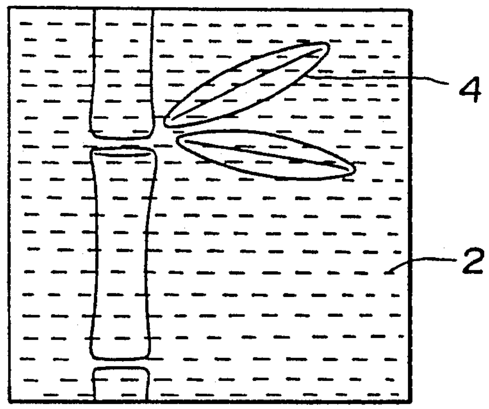
FIG. 2 is a plan view to show the handicraft article of FIG. 1.

The production of the handicraft article of the present invention may be carried out by an operator who simultaneously refers to a draft design beside him/her, as one embodiment. Another embodiment is illustrated in FIG. 2, where the above mentioned plane fastener (2) as the base sheet is composed of a light-permeable material such as a transparent or semi-transparent material. A desired draft design (4) is personally drawn on the back surface of the plane fastener (2) by an operator or is previously printed thereon in such a way that the draft design (4) may be seen through the surface of the plane fastener (2), and the pieces (1) of the above-mentioned bulky work threads are applied to the intended portions in order and in accordance with the draft design (4) as seen through the surface of the plane fastener (2), whereupon the desired design is expressed on the surface of the base sheet as the aggregates of the thus fixed pieces (1).

In the operation of producing the handicraft article of the present invention as mentioned above, where the pieces (1) to be fixed with the fixing elements (3) are long-size thread materials such as bulky work threads, such materials are previously cut to a predetermined length before use. After the long-size materials have been fixed onto the determined portions of the base sheet, then the materials may be cut at the necessary sizes. On the other hand, where the pieces (1) are tabular materials such as plane fastener pieces which form a pair with the plane fastener (2) as the base sheet, the tabular materials are previously cut to a desired shape before use.

Figure 3:
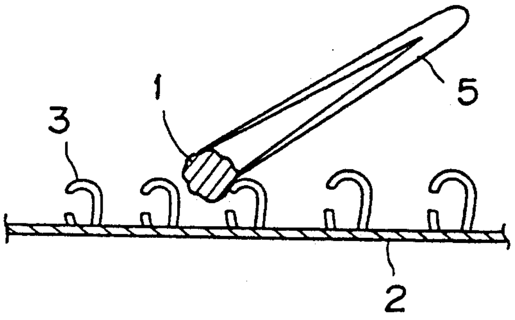
FIG. 3 to FIG. 8 are explanatory views to show the steps of producing the handicraft article of the present invention.
Figure 4:
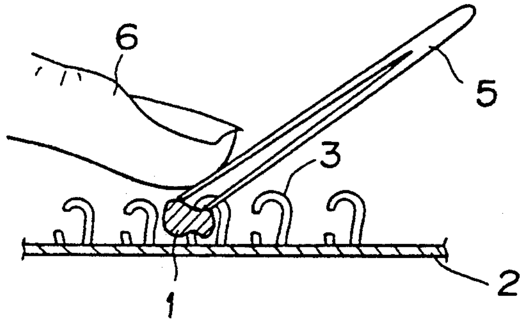
Figure 5:
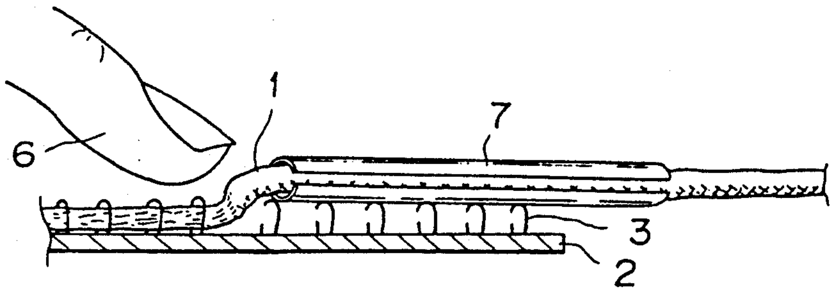

The pieces (1) may be nipped with fingers and set onto the determined portions of the plane fastener (2) and thereafter the thus set pieces are pressed with the finger to the portions so as to fix them with the fixing elements (3). However, if the pieces (1) are so fine that they are difficult to be handled with fingers, the fine pieces (1) may be picked up with a pincette (a pair of tweezers) (5) and set onto the determined portions of the plane fastener (2), as shown in FIG. 3, and thereafter the thus set pieces are pressed with a finger (6) to the portions so as to embed them into the fixing elements (3), as shown in FIG. 4. In such a way, the operation may be effected with ease.

In particular, where a lily yarn, a kind of bulky work thread, is used as the piece (1), while it is untwisted from the twisted thread form during use, it is advantageous that the lily yarn for the piece (1) is put in a slitted vinyl polymer tube (7) and the piece (1) is then embedded into the fixing element (3) while it is pressed with a finger (6). In such a way, any unnecessary entangling of the piece (1) to be fixed with the fixing element (3) may be prevented.

Regarding the above-mentioned draft design (4), for example, any desired draft design composed of patterns, figures and/or letters may be personally drawn by an operator who makes the handicraft article of the present invention, on any desired base paper, and the thus design-drawn base paper is used as a draft design sheet to be attached to the back surface of the abovementioned light-permeable plane fastener (2). If desired, pieces of gravure pictures from magazines may be attached to the base paper to form a draft design sheet. As the case may be, pieces of gravure pictures from magazines may directly be attached to the back surface of the above-mentioned light-permeable plane fastener (2).

Additionally, a background sheet for expressing a background color or a background scene may advantageously be attached to the back surface of the light-permeable plane fastener (2) to thereby enrich the expression of the finished handicraft article. If desired, a draft design may directly be drawn on the background sheet in order that the sheet is used as a draft design sheet.

Further, by diversifying the colors, shapes and materials of the plane fastener (2) and the pieces (1) to be fixed with the fixing elements (3) on the fastener (2), handicraft articles of various kinds and designs can be produced. In addition, a silver powder or silver flakes may be spray-painted onto the finished handicraft article so as to enhance the decorative effect of the article, if desired. In particular, where bulky crimped threads are used as the pieces to be fixed with the fixing elements, the pieces are fixed onto the base sheet in such a way that they are piled up and mounted in double on the sheet. In this case, the pieces (1) are fixed with the fixing elements (3) on the base sheet as the plane fastener (2) in such a way that they overwrap not only the parts of the draft design but also the parts of the fixing elements (3) o the plane fastener (2) without exposing outside, and therefore an extremely beautiful three-dimensional handicraft article is formed.

If desired, a protecting material such as a transparent lacquer may be spray-painted onto the surface of the handicraft article thus produced, or a transparent film may be laminated over the surface of the same, for the purpose of protecting the article. The handicraft article may be set in a picture frame directly or after protected as mentioned above. The thus framed handicraft article of the present invention may be a high-quality decoration, which has a three-dimensional scene and other various expressions like an embroidered article and further has other additional expressions than those of an embroidered article. Thus, the present invention gives a new and advantageous handicraft article.

Figure 6:
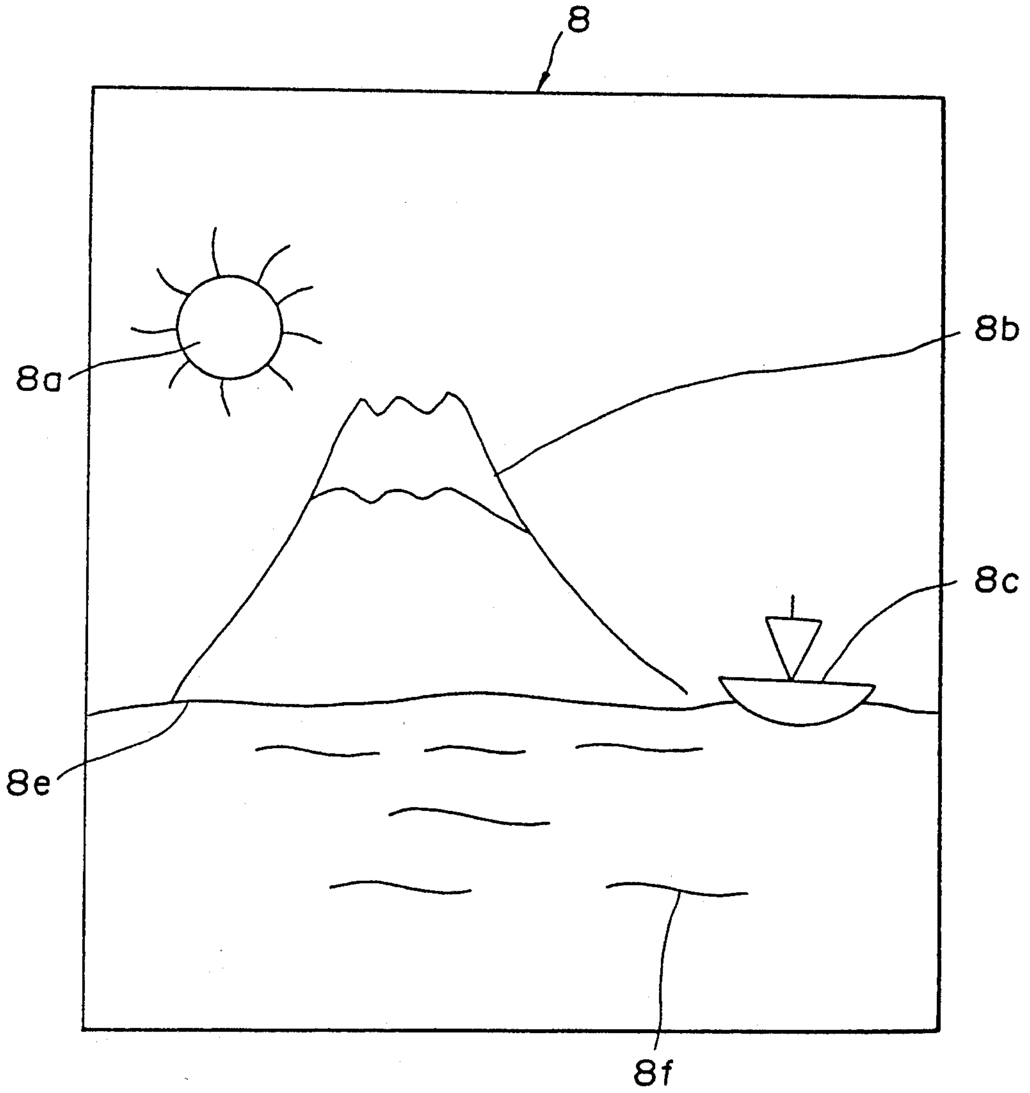
Figure 8:
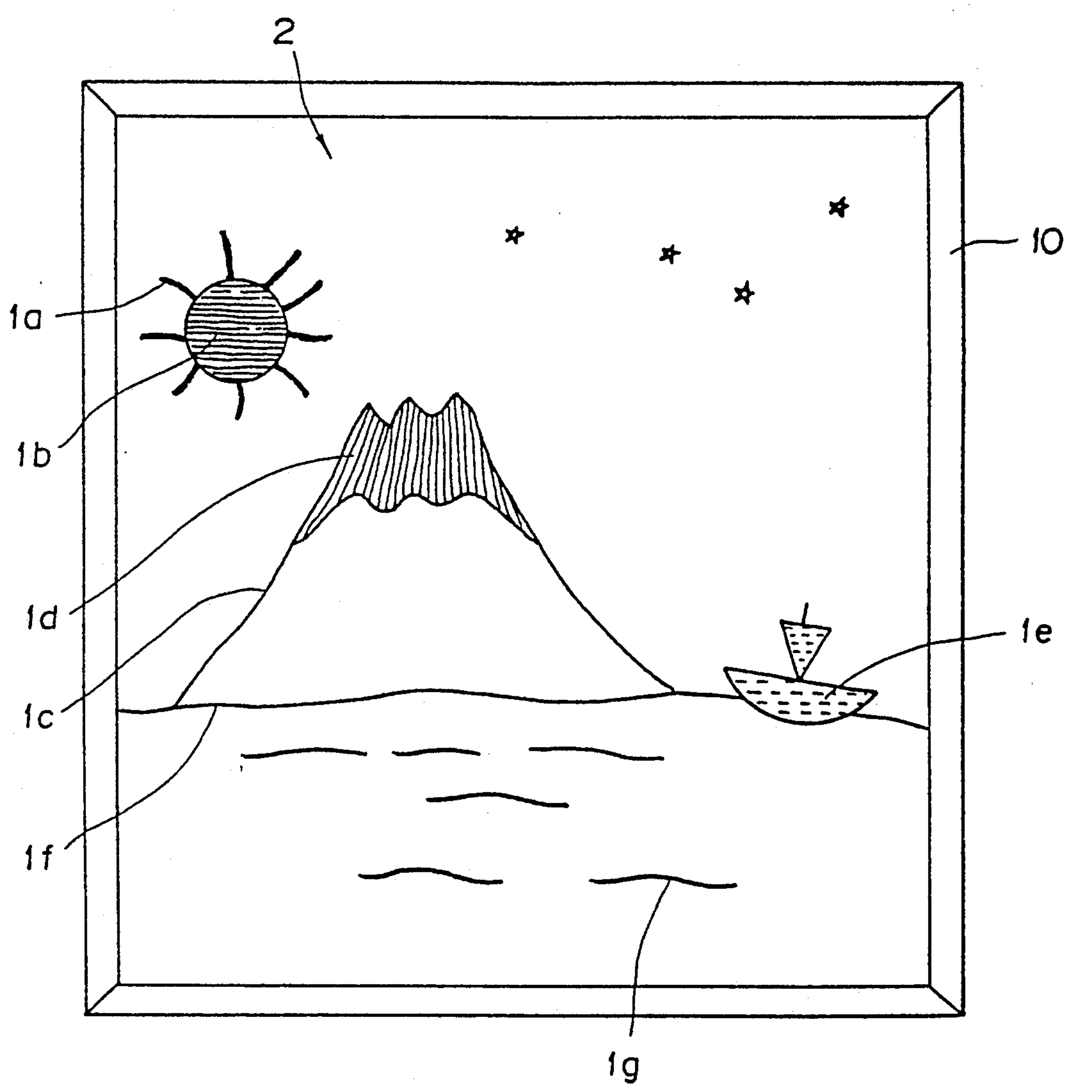

As one example, a draft design is drawn by an operator, who is to produce the handicraft article of the present invention, on a proper base paper such as a drawing paper, or a draft design sheet (8) having a previously printed draft design is prepared, for example, as shown in FIG. 6, and the draft design sheet (8) is attached to the back surface of the above-mentioned light-permeable plane fastener (2), and thereafter the pieces (1) are applied to and fixed with the fixing elements (3) in accordance with the draft design as seen through the surface of the plane fastener (2). In the present example, for instance, a red or yellow lily yarn (1*a*) is applied to the outline of the part of the sun (8*a*) while lily yarn bundles (1*b*) of the same color are applied to the inside part of the same; a brown lily yarn (1*c*) is applied to the outline of the part of Mt. Fuji (8*b*) while white lily yarn bundles (1*d*) are applied to the top of Mt. Fuji as snow; a white looped plane fastener (1*e*), which is fixed to and forms a pair with the plane fastener (2) and which has been cut to the form of a ship, is applied to the part of the ship (8*c*); and blue and white lily yarn (1*f*) and (1*g*) are applied to the parts of the horizontal line (8*e*) and the wave (8*f*), respectively, as shown in FIGS. 8 and 6.

Figure 7:
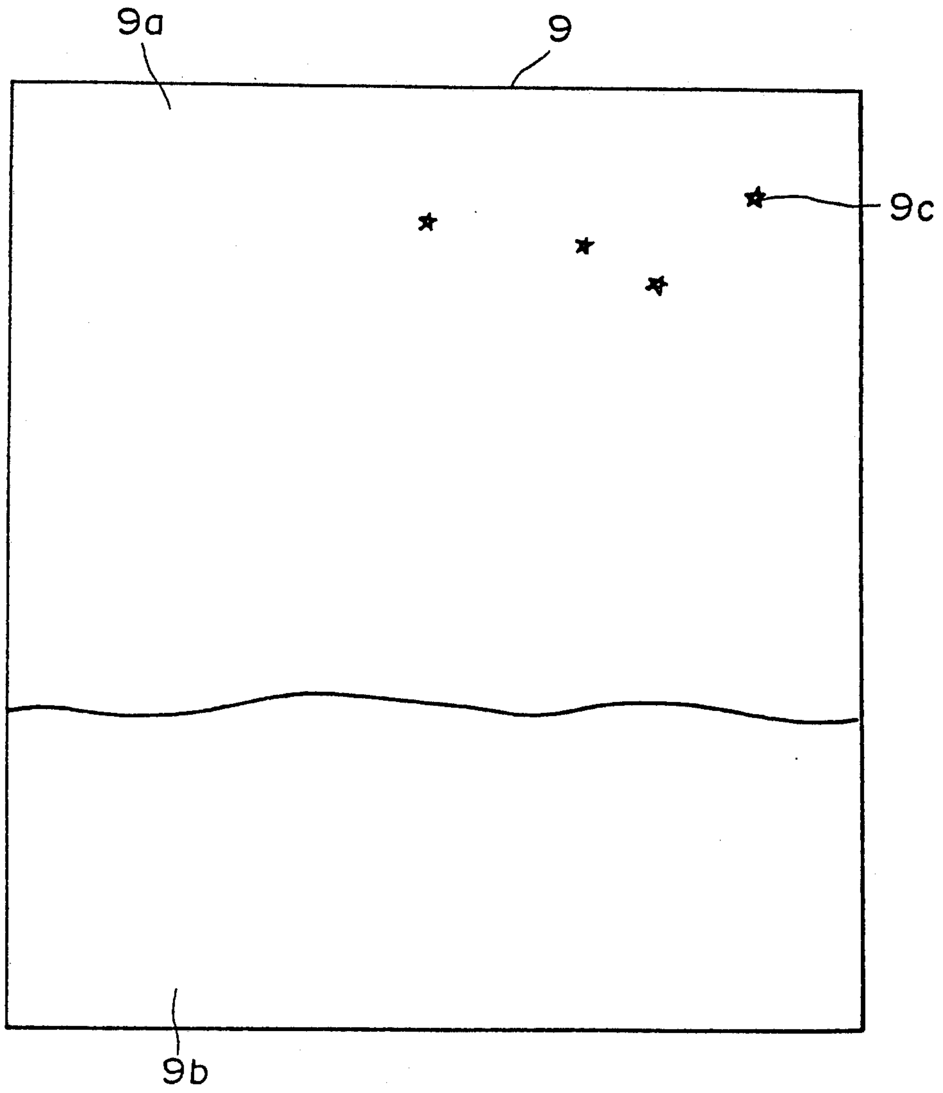

After the intended design has been expressed on the plane fastener (2), as mentioned above, the draft design sheet (8) as attached to the back surface of the plane fastener (2) is removed, and a background sheet (9) of FIG. 7 is then attached to the back surface of the plane fastener (2) in place of the sheet (8). The background sheet (9) is, for example, colored in a ruddy evening sun color in the upper sky part (9*a*) while it is colored in a blue marine color in the down sea part (9*b*); and the former sky part (9*a*) has stars (9*c*) as expressed by spray-coating a gold powder or glass pieces thereto. The combined plane fastener (2) and background sheet (9) are set in a picture frame (10) to obtain a completed handicraft article.

As is obvious from the above-mentioned example, various pieces may simply be fixed onto a base sheet to easily complete a lot of designs of various kinds, in accordance with the present invention. The present invention does not need a needle in forming the handicraft article, which is different from a socalled embroidery work. Additionally, preparation of draft designs may be made with ease by various simple means, for forming the handicraft article of the invention. In the finished handicraft article of the present invention, since the pieces are simply fixed with the fixing elements as provided on the base sheet, the design may partly or wholly be repaired or corrected with ease.

Accordingly, the handicraft article of the present invention having the above-mentioned various advantageous merits may easily and simply be produced by anyone in all ages and both sexes and therefore it is useful as a domestic hobby work or as a handicraft work in school.

While the invention has been described in detail and with reference to specific embodiments thereof, it will be apparent to one skilled in the art that various changes and modifications can be made therein without departing from the spirit and scope thereof.

What is claimed is:

1. A handicraft article, comprising, a base sheet formed of a light-permeable material and having front and back surfaces, fixing elements integrally fixed onto an entire area of the front surface of the base sheet to extend outwardly from the front surface and having hooks therein, a draft design sheet having a draft design thereon, said draft design sheet being placed behind the back surface of the base sheet when the article is being formed so that the draft design on the draft design sheet is seen through the base sheet, work threads applied onto the front surface of the base sheet with reference to the draft design on the draft design sheet placed behind the base sheet, said work threads, when pushed onto the base sheet, being retained by the hooks of the fixing elements while locations of the work threads fixed to the hooks are adjustable when required so that a desired design is formed on the front surface of the base sheet by the work threads applied thereon, and a background sheet placed behind the base sheet after the work threads are placed onto the base sheet and the draft design sheet is removed from the base sheet, said background sheet having a background color and a background scene thereon so that the background color and the background scene on the background sheet is seen through the base sheet together with the design formed by the work threads.

* * * * *